United States Patent [19]

Fiocco et al.

[11] Patent Number: 4,528,068
[45] Date of Patent: Jul. 9, 1985

[54] TRAY APPARATUS FOR DEASPHALTING AND EXTRACTION

[75] Inventors: Robert J. Fiocco, Summit; Edward Niessen, Passaic, both of N.J.

[73] Assignee: Exxon Research and Engineering Co., Florham Park, N.J.

[21] Appl. No.: 592,381

[22] Filed: Mar. 22, 1984

[51] Int. Cl.³ .............................................. C10G 21/00
[52] U.S. Cl. .................................. 196/14.52; 208/86; 208/317; 261/114 R; 422/256
[58] Field of Search ...................... 196/14.52; 208/309, 208/86; 261/114 R; 208/317; 422/256, 257

[56] References Cited

U.S. PATENT DOCUMENTS

| | | | |
|---|---|---|---|
| 2,123,642 | 6/1934 | Wiezevich | 196/14.52 |
| 2,274,030 | 7/1938 | Atkins, Jr. | 196/14.52 |
| 2,400,378 | 5/1946 | Stines | 208/317 |
| 2,447,404 | 8/1946 | Furby | 208/317 |
| 2,520,391 | 1/1947 | Findlay | 261/114 |
| 2,669,539 | 12/1950 | Ditman | 196/14.46 |
| 2,707,163 | 2/1955 | Thibaut | 196/49 |
| 2,746,846 | 5/1956 | Grunewald et al. | 422/257 |
| 2,752,229 | 6/1956 | Brown et al. | 422/256 |
| 2,776,329 | 1/1957 | Mayeux | 422/256 |
| 2,902,413 | 9/1958 | Kassel et al. | 196/14.52 |
| 2,950,244 | 9/1958 | Lawson, Jr. | 208/309 |
| 4,234,544 | 11/1980 | Christman | 422/256 |

FOREIGN PATENT DOCUMENTS 823610  11/1959  United Kingdom ............ 261/114 R

Primary Examiner—Jay H. Woo
Assistant Examiner—Mike McGurk
Attorney, Agent, or Firm—Joseph J. Dvorak

[57]  ABSTRACT

An improved sealed-sieve tray extraction tower has pipe means located in at least a portion of the downcomer or upcomer zones, as the case may be, for delivering at least a portion of a first continuous phase through the downcomer or upcomer zone such that it is not broken into fine droplets thereby minimizing the potential for dispersion of the continuous phase.

6 Claims, 4 Drawing Figures ial view and section of a prior art extraction tower
TRAY APPARATUS FOR DEASPHALTING AND EXTRACTION

BACKGROUND OF THE INVENTION

1. Field of the Invention

The present invention relates to extraction processes. Particularly, the present invention is concerned with minimization of undesirable entrainment of insoluble phases in solvents employed in extraction towers having sealed-sieve trays. Indeed, in its more specific aspects, the invention is directed toward minimization of entrainment of the asphalt phase in the deasphalted oil solution in a deasphalting tower having sealed-sieve trays.

2. Prior Art References

There are many extraction processes known in the art. Reference is made to the following U.S. Patents to mention just a few: Nos. 2,274,030; 2,123,642; 2,950,244; 2,669,539; 2,520,391 and 2,707,163. Of particular interest is U.S. Pat. No. 2,950,244 since it teaches a process for extracting a residuum petroleum fraction with a hydrocarbon solvent using a sealed-sieve tray extraction tower of the type with which the present invention is especially concerned.

Referring specifically to liquid-liquid extraction processes such as deasphalting processes commonly used for the separation of asphalt from residuum to produce a deasphalted oil, a light hydrocarbon solvent, such as propane or butane, is introduced into the bottom of an elongated vertical extraction tower having a plurality of perforated plates referred to as sealed-sieve trays. The light liquid phase flows upwardly through the extractor in countercurrent direction to the continuous heavy residuum or asphalt phase which flows generally downwardly through the extractor. The deasphalted oil-containing solvent solution is withdrawn from the top of the deasphalter and asphalt solution is withdrawn from the bottom.

To promote efficient liquid-liquid contact each sealed-sieve tray is provided with end weirs and a vertical downwardly extending plate. The end weirs permit the retention of a layer of the heavy phase liquid on the top surface of the tray prior to flowing to the next lower tray via a downcomer zone. A downwardly extending plate defines, with the side of the extractor vessel, a downcomer zone and together with the layer of liquid on the plate below seal the downcomer zone from the light liquid phase. Consequently the light liquid phase flows upwardly through the perforations in each of the trays and is thereby dispersed into droplets which then rise through the heavy continuous phase layer on top of the plate.

Trays are sometimes provided above the feed inlet in a refluxing zone in order to promote efficient contacting and separation between the upward-rising light liquid phase and either a downward-flowing wash oil or a reflux oil precipitated from the light phase by a temperature change at the top of the tower.

As is known, in the use of such towers small amounts of residuum and/or asphalt phase are entrained in the deasphalted oil solution leaving the top of the extractor. Inclusion of the residuum or the asphalt in the deasphalted oil, of course, greatly deteriorates the quality of the deasphalted oil. In the past, when the entrainment has become too severe, attempts have been made to reduce this entrainment, particularly at high feed and solvent rates, by feeding the residuum at a lower tray in the tower in order to provide more separation zones above the feed. Unfortunately this technique reduces the yield of the deasphalted oil since fewer trays are used for promoting extraction between the residuum and solvent phases. Thus there remains a need, particularly as flow rates are increased, for reducing undesirable entrainment of the insoluble phase in the solvent of solvent extraction processes, and particularly to avoid the entrainment of asphalt and residuum phases in the deasphalted oil-containing solvent in the extraction of residuum.

SUMMARY OF THE INVENTION

Simply stated the present invention provides for a sealed-sieve tray extraction tower which minimizes entrainment of a first continuous phase in the second or solvent phase by pipe means for delivering at least a portion of the first continuous phase through the conduit or downcomer zone in such towers to the next tray substantially as a continuous stream whereby that portion of the first phase does not break into fine drops which may become entrained in the solvent phase in the conduit or downcomer zone.

In one embodiment, the invention optionally includes the use of elevated perforations on the tray preceding the first continuous phase feed tray in order to prevent re-entrainment of a heavy phase liquid which may collect on that tray under some circumstances.

BRIEF DESCRIPTION OF THE DRAWINGS

The present invention will be further illustrated by reference to the drawings in which

Referring now to FIG. 1 of the drawings, reference numeral 10 designates an extraction tower which is provided with a plurality of horizontally disposed plates or sealed-sieve trays 11. Extraction tower 10 includes a heating coil 2 and feed inlet solvent inlet lines 3 and 4 respectively for the introduction of a heavy continuous feed, designated generally as 14, to be extracted and for the introduction of a light solvent for extracting deasphalted oil from the continuous heavy feed. As is shown, the heavier feed is introduced onto an upper feed tray and, as indicated by the arrows flows horizontally over the surface of the tray and then passes generally downwardly through the extraction tower 10. The light solvent is introduced via line 4 at the bottom of the tower 10 and passes upwardly in countercurrent flow to the heavy continuous feed. A splash plate 5 is shown for distributing the light phase introduced into the tower 10. The heating coil 7 is used to generate a reflux oil which drops down onto the topmost tray and flows down the tower.

Figure 1:
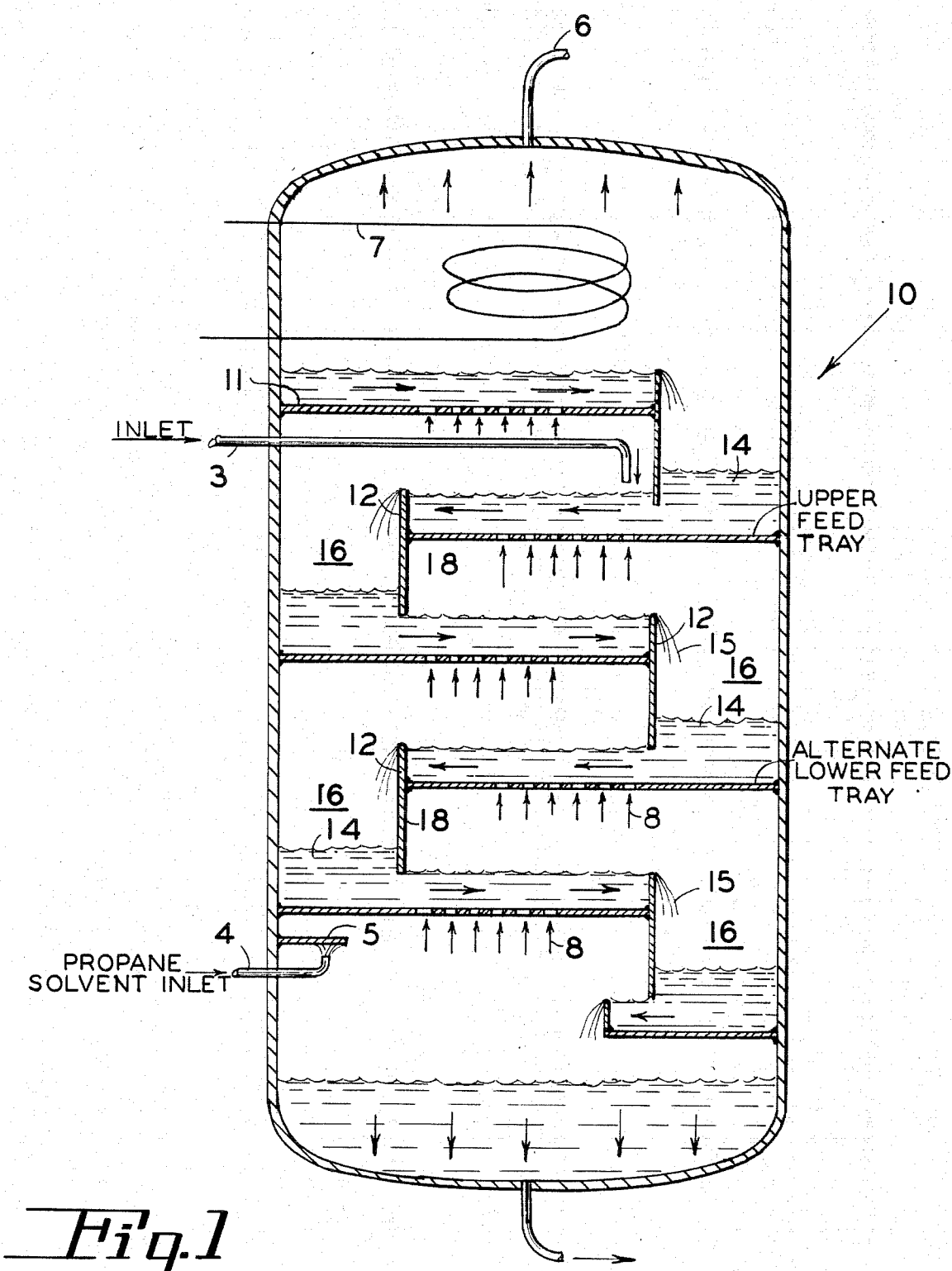
FIG. 1 is an elevational view and section of a prior art extraction tower used for the extraction of residuum.

As is shown, each of the sieve trays 11 is provided with an end weir 12 for maintaining the height of the heavy continuous phase 14 on the surface of the sieve tray. As the level of the heavy phase exceeds the height of the weirs 12, the heavy continuous phase 14 will spill over the weir as shown by the dotted lines 15 and descend through downcomer zones 16 for collection on the next succeeding sieve tray. In spilling, the heavy phase breaks up into fine droplets in the light phase and tends to be entrained upward by the light phase flowing up the tower. This breakage is made more severe due to the carryover of light phase droplets in the heavy phase as it spills over the weir.

The vertical plate 18 extending downwardly from sieve tray 11 to a point below the top of the end weir 12 on the top of the sieve plate immediately below forms with the wall of the tower 10 a downcomer zone 16 and operates with the heavy phase 14 to seal off the downcomer zone as a pathway for direct flow of light phase upwardly through the tower 10.

Consequently, the light phase, as shown by arrows 8, passes through the perforations in the tray 11 where it is dispersed in the heavy phase 14.

Experience has shown that varying amounts of residuum and asphalt droplets are entrained in the solvent passing upwardly through the tower 10 thereby affecting the overall quality of the deasphalted oil recovered from the oil containing solvent.

Figure 2:
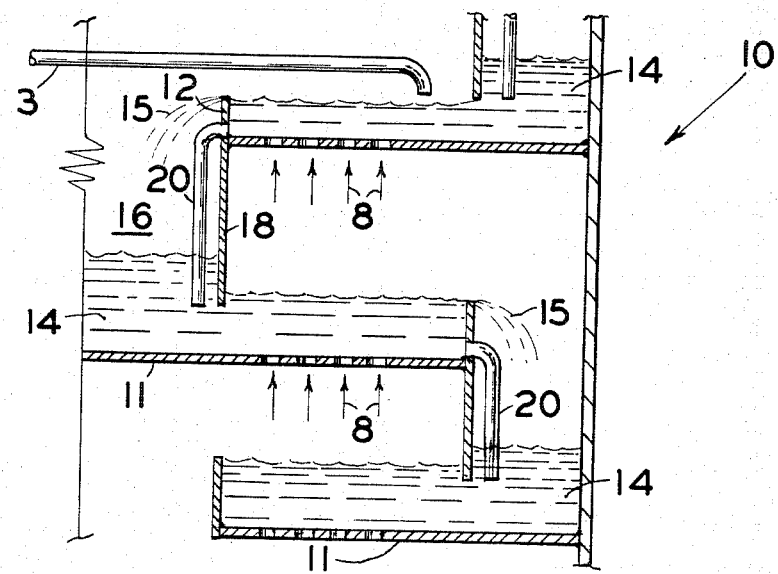
FIG. 2 is a sectional side elevation of one embodiment of an extraction tower according to this invention in which a light second phase fluid is dispersed in a heavy first phase continuous fluid.

It has now been found that the quality of the deasphalted oil obtained from such extraction towers can be enhanced if the continuous heavy portion, i.e., the residuum portion, is delivered to the next lower tray in a manner sufficient that spilling of the residuum and its breakup and droplets is substantially reduced. This is achieved as is shown in FIG. 2, wherein numerals 1 to 18 are identical to the similar reference numerals in FIG. 1. Instead of permitting all of the heavy continuous phase proceeding from one tray to the next from spilling over end weirs 12 through downcomer zones 16, thereby being dispersed into droplets, drain pipes 20 are provided for conveying at least a portion of the heavy phase flow to the next lower tray without dispersing it, thereby reducing the amount of spilling over end weir 12 and the amount of entrainment normally resulting therefrom. For example, the height of the weir 12 typically will range from 6 to 18 inches; the diameter of the drain pipes 20 typically will range from ½ to 2 inches and be designed to convey from about 10% to about 100% of the heavy phase flow, thereby proportionally reducing the amount of entrainment which would have been generated due to spilling of heavy phase over weir 12 into downcomer zone 16.

Figure 3:
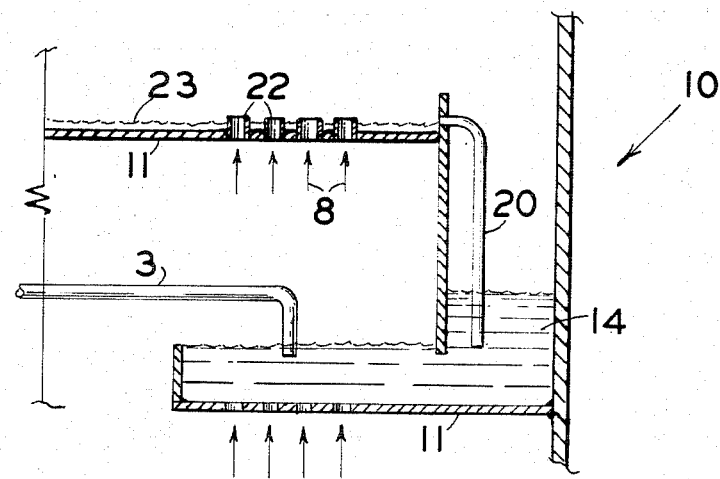
FIG. 3 is a sectional side elevation showing a particularly preferred tray for use above the feed tray in the tower of the invention.

Experience has also shown that entrainment also occurs under some conditions at the tray above the feed tray. For example, when the extractor is operated in a nonrefluxing mode, that is, with essentially no wash oil being added at the top of the tower and with essentially no temperature gradient imposed by the steam coil, the tray above the feed tray is not sealed thereby permitting the light phase to flow up the downcomer zone above the feed tray entraining residuum which tends to build up in a thin layer on the tray above the feed tray, even when drain pipes are provided. This thin residuum layer on this tray is violently mixed by the jets of solvent flowing through the perforations and cannot flow to the drain pipe, and thus becomes re-entrained in the solvent flowing up and finally out of the tower. Thus, as is shown in FIG. 3, it is particularly preferred in the practice of the present invention to provide elevated perforations or nozzles 22 extending upwardly from the top surface of tray 41 in the tray above the feed tray so that the thin residuum layer, shown as layer 23, will not be entrained by the jets but instead will flow to the drain pipe 20 to the feed tray below. Thus, for example, the perforations or nozzles 23 might be elevated as much as 2 or 3 inches. In order to avoid any loss of mass transfer efficiency due to the reduction in the contact zone height during normal refluxing conditions; the height of the overflow weir 12 in this particular instance preferably is increased equivalently so that the height of the heavy layer in direct contact with the light phase during refluxing conditions is the same as it would have been if the perforations 23 were not elevated.

It should be readily apparent that not all of the sieve trays in an extraction tower have to be equipped with the foregoing improvements. For example, the drain pipes 20 which minimize spilling of the heavy phase 14 and its subsequent entrainment are most desirable on the upper most trays 11 closest to the solvent solution outlet. The elevated perforations or nozzles 23 are most desirable on the tray above the feed tray. Thus towers already in operation can be readily improved by modifying only a few of the trays in said towers.

It should also be appreciated that the foregoing invention can be equally applied to other liquid-liquid extractors with sealed-sieve trays of the type wherein a heavy phase is dispersed in a light phase which flows across the bottom of the sieve trays and up upcomers. Such an arrangement is shown in FIG. 4.

Figure 4:
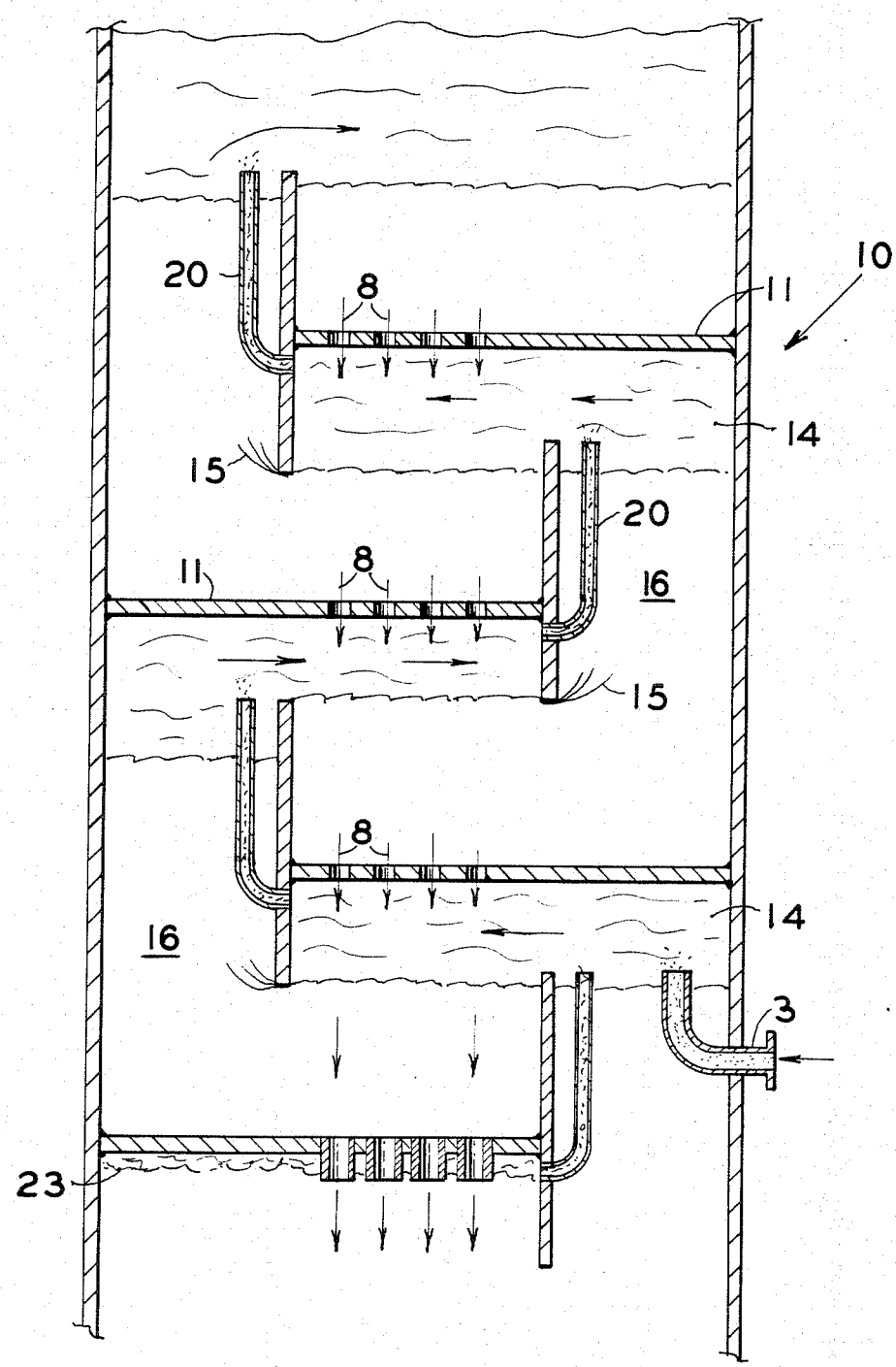
FIG. 4 is a sectional side elevation showing another embodiment of an extraction tower of the present invention in which a heavy second phase fluid is dispersed in a light first continuous phase fluid.

As can be seen in FIG. 4, tower 10 is equipped with horizontally disposed sieve trays 11, each of which is provided with vertical plates 18 for sealing off the flow of the heavy dispersed phase shown by arrows 8 from the upcomer zones 16. Also each tray is provided with an end weir 12 which with the tower wall defines the upcomer zones 16. Some spilling of the light continuous phase 14 over end weirs 12 is shown by lines 15. Pipe means 20 are located in end weirs 12 and pass through conduit or upcomer zone 16 for delivering at least a portion of the light continuous phase 14 to the next succeeding tray above without dispersing it thereby reducing the amount of entrainment therefrom.

An optional feature also is shown in FIG. 4. This optional feature is the inclusion of nozzles 22 located on the tray 11 prior to the light continuous phase feed inlet 3.

What is claimed is:

1. In an extraction tower of the sealed sieve tray type for contacting and extracting a first continuous phase fluid in countercurrent flow with a second fluid and wherein said tower has a plurality of horizontally disposed sieve trays each of which has vertical end weirs for retention of a portion of said first continuous phase fluid over the surface of said sieve tray and over which the balance of said first continuous phase fluid flows, said end weirs defining a conduit with the wall of the tower for passage of the first continuous phase which overflows said weir from tray to tray on its progression through the tower, the improvement comprising: pipe means located in at least a portion of said conduits, said pipe means having a first end opening in said end weir and a second end opening above the next succeeding sieve tray in the tower for conveying at least a portion of said first phase fluid to the next succeeding sieve tray in the tower without significant dispersion into droplets whereby entrainment of said first phase and said second phase is minimized.

2. The improvement of claim 1 wherein said pipe means is capable of conveying from about 10% to about 100% of said first phase from one tray to the next succeeding tray without significant dispersion of said first phase fluid into droplets.

3. An apparatus for continuous countercurrent contacting of and extracting of two fluids having different specific gravities comprising:
- a vertical column having a plurality of horizontal upper and lower trays having a plurality of perforations therein;
- means for introducing a heavier phase fluid onto the top of one of said upper trays;
- means for introducing a lighter phase fluid into said column at a point substantially below the point at which the heavier phase fluid is introduced;
- outlet means for continuously withdrawing lighter phase fluid from the top of said column;
- outlet means for continuously withdrawing heavier fluid from the bottom of said column;
- weirs extending upwardly from the top end of each of said trays and vertical plates extending downwardly from each tray to the tray therebelow to a point below the height of the end weir on the tray below, said end weir and said vertical plates defining with the wall of the extractor a downcomer zone; and,
- pipe means located in at least the downcomer zone for the upper trays, said pipe means having a first end opening in an end weir and a second end opening above said next succeeding tray for conveying a substantial portion of the heavy fluid to the top of the next lower tray without significant dispersion of the heavy fluid phase into droplets whereby entrainment of said heavy phase and said light phase is minimized.

4. The apparatus of claim 3 wherein said pipe means is capable of conveying from about 10% to about 100% of said heavy fluid to the top of the next lower tray.

5. The apparatus of claim 4 wherein said pipe means is located in said end weir.

6. The apparatus of claim 4 including upwardly extending nozzles for each of said perforations in said tray above the means for introducing heavier phase liquid into said column.

* * * * *